United States Patent [19]

Chen

[11] Patent Number: 5,815,885
[45] Date of Patent: Oct. 6, 1998

[54] CASTER STRUCTURE FOR CASES

[76] Inventor: Ding-Fang Chen, 422, Section 1, Chung Shan Road, Tah Chia Township, Taichung, Taiwan

[21] Appl. No.: 837,110

[22] Filed: Apr. 14, 1997

[51] Int. Cl.$^6$ .................................................. A47B 91/00
[52] U.S. Cl. .............................. 16/47; 16/18 B; 16/18 R
[58] Field of Search .................. 16/47, 42 R, 18 R, 16/18 B; 190/18 A; 280/29, 239, 47.131, 47.16; 301/5.1, 36.1

[56] References Cited

U.S. PATENT DOCUMENTS

| 849,527 | 4/1907 | Bowers | 280/47.131 |
|---|---|---|---|
| 887,821 | 5/1908 | Lang | 280/47.131 |
| 954,993 | 4/1910 | Peters | 280/47.16 |
| 1,066,754 | 7/1913 | Rison | 16/18 B |

FOREIGN PATENT DOCUMENTS

| 212380 | 2/1941 | Switzerland | 16/18 B |
|---|---|---|---|
| 584079 | 1/1947 | United Kingdom | 16/18 B |

*Primary Examiner*—Chuck Mah
*Attorney, Agent, or Firm*—Bacon & Thomas

[57] ABSTRACT

A caster structure for cases including a coupling frame and a plurality of rollers. The coupling frame is comprised of a curved plate and two protective covers extending from the lateral edges of the bottom side of the plate such that they define a clearance therebetween. The rollers are pivotally mounted on the protective covers in the clearance. The outer circumferences of every two adjacent rollers form a level line and may come into contact with the ground surface simultaneously to facilitate pulling and provide a steadier movement.

4 Claims, 4 Drawing Sheets

CASTER STRUCTURE FOR CASES

BACKGROUND OF THE INVENTION (a) Field of the Invention

The present invention relates generally to a caster structure for case, and more particularly to a caster comprising a plurality of rollers mounted therein, which allows movement in different directions.

(b) Description of the Prior Art

FIG. 1 shows a caster generally mounted on cases, such as traveling cases, trunks and the like. The conventional caster 10 comprises a curved plate 11, and a receiving plate 12 of a substantially U-shaped section formed above the plate 11. The receiving plate 12 is pivotally connected to a flat, circular wheel 13 near the center of the plate 11. Two symmetrical coupling covers 14 are secured via through holes 15 at the corner of the case A. But such conventional casters have the following drawbacks in terms of assembly and use:

1. As the caster and the coupling covers will project into the interior of the case, the available space in the case will be more limited. Besides, at least two casters are have been provided at the corners inside the case, which will press the clothing or documents carried in the case.
2. The case must be provided with through holes for mounting the casters. The through holes have considerable adverse effect on the structural strength of the case, and the case will not be durable.
3. Referring to FIG. 2, when in use, the wheel 13 has only a single point contact with the ground surface. As the imaginary center of weight B of the case A forms different distances D1, D2, D3 with the wheel 13 depending on the height of the user, unless the user stands still with the case A in an upright position, the case will slide at an inclining angle, which will require a relatively large force to hold it in position.

There has been an improved caster structure for overcoming the above drawbacks, but it is only suitable for use along slopes and is complicated in structure and difficult to assemble.

SUMMARY OF THE INVENTION

Accordingly, a primary object of the present invention is to provide a caster structure which permits smooth and steady pulling of the case, and which is simple in construction and quick to assemble. Besides, it will not affect the structural strength and the available space of the case.

In order to achieve the above object, the present invention essentially comprises a curved plate having two opposing protective covers extending vertically from the lateral edges of a bottom side thereof. A plurality of cylindrical rollers are pivotally mounted between the protective covers such that when the outer circumferences of two adjacent rollers define a level line and form an inclining angle with the rest of the rollers, they may simultaneously come into contact with the ground surface to provide steadier movement.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
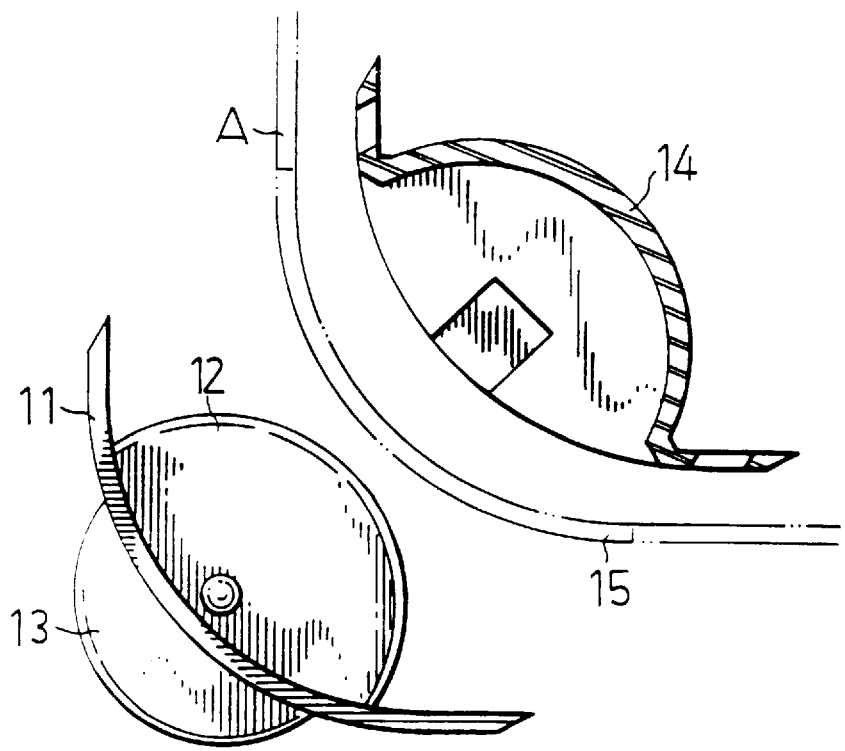
FIG. 1 is a schematic exploded view of the conventional caster structure.
Figure 2:
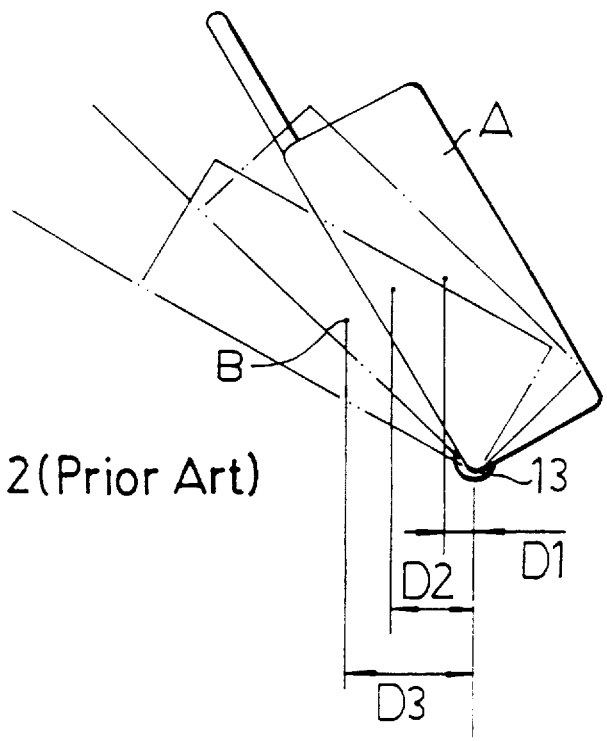
FIG. 2 is a schematic view illustrating the conventional caster in use.
Figure 3:
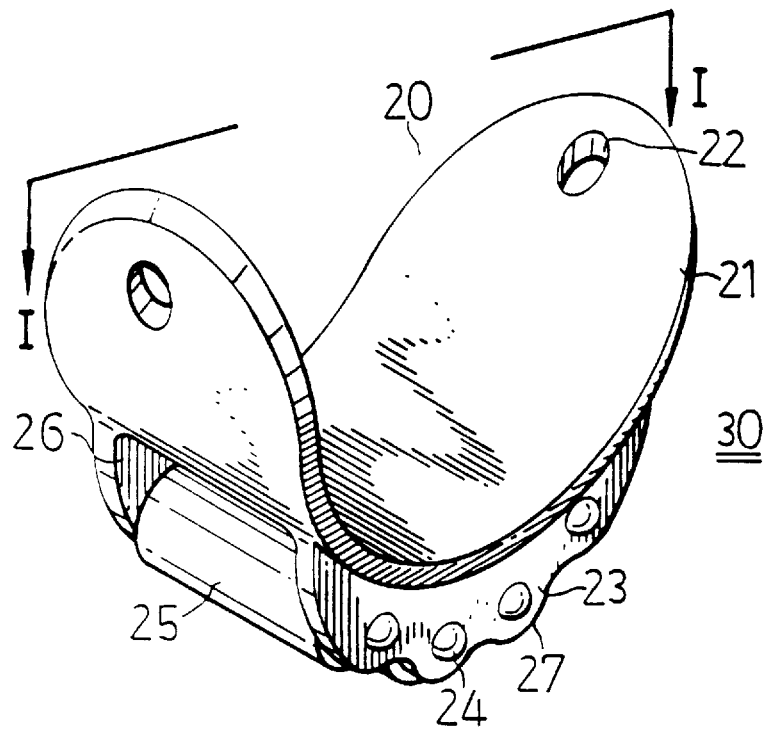
FIG. 3 is a schematic elevational view of a first preferred embodiment of the present invention.

With reference to FIG. 3, a caster 30 according to a preferred embodiment of the present invention essentially comprises a substantially curved plate 21 with two positioning holes 22 each located at one end thereof. A locking element (not shown) such as a screw, bolt, or the like, is passed through the positioning holes 22 to lock the plate 21 to the case. Two symmetrical protective covers 23 extend vertically from the lateral edges of the bottom side of the plate 21, defining a clearance 26 therebetween, thus forming a coupling frame 20. A plurality of shafts 24 are used to pivotally secure four cylindrical elements 25 in the clearance 26 at the lower portion of the protective covers 23. Each cylindrical element 25 may freely roll and has a portion projecting from the lower rims 27 of the protective covers 23 at both sides for contacting the ground surface when pulled.

Figure 4:
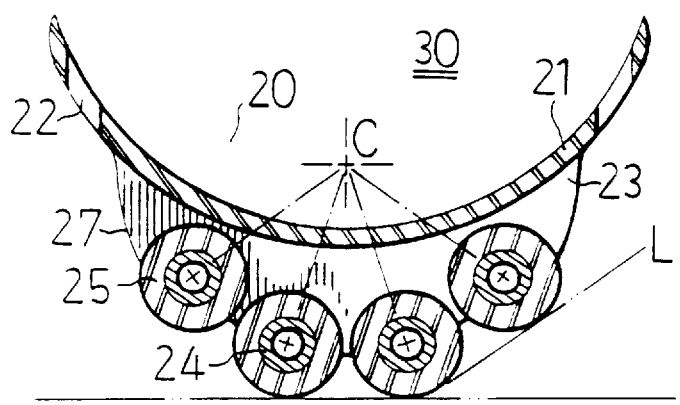
FIG. 4 is a schematic sectional view taken along line I—I of FIG. 3.

Referring to FIG. 4, based on the principle of concentricity, each cylindrical element 25 is pivotally positioned between the two protective covers 23 by the shaft 24 with an imaginary center C as its axis. Under the condition that the outer circumference of each cylindrical element 25 does not come into contact with the bottom side of the plate 21, a portion thereof projects from the bottom rims 27 of the protective covers 23. Besides, every two adjacent cylindrical elements 25 define a level imaginary line L therebetween. Each level imaginary line L has an inclining angle with the other level imaginary lines L. When the case is pulled, preferably, two cylindrical elements 23 are in contact with the ground surface to provide steadier movement. Besides, the frictional force of the two cylindrical elements 23 may relatively reduce the holding force which checks slidable displacement, which is also force-saving for the user.

Figure 5:
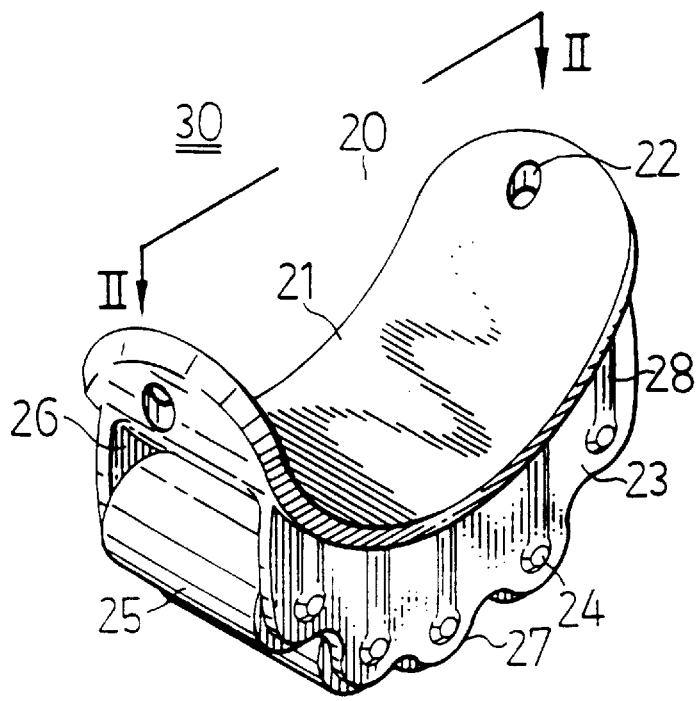
FIG. 5 is a schematic elevational view of a second preferred embodiment of the present invention.

In FIG. 5, the caster 30 comprises a coupling frame 20 including a curved plate 21 and two opposing protective covers 23 integrally extending vertically from the bottom side of the plate 21. A clearance 26 defined between the protective covers 23 accommodates five tubular cylindrical elements 25, which are pivotally positioned at the lower portion of the protective covers 23 by respective shafts 24. A portion of each cylindrical element 25 projects from the bottom rims 27 of the protective covers 23. In addition, a reinforcing rib 28 for matching the position of each shaft 24 is formed on the protective cover 23 for enhancing the strength of the entire structure.

Figure 6:
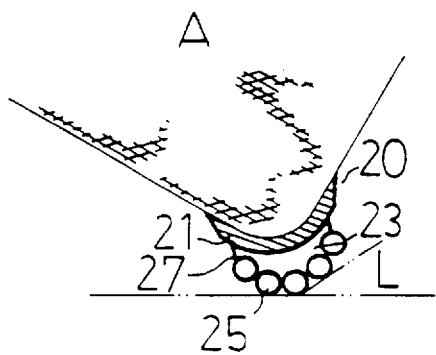
FIG. 6 is a schematic view illustrating use of the caster shown in FIG. 5.
Figure 7:
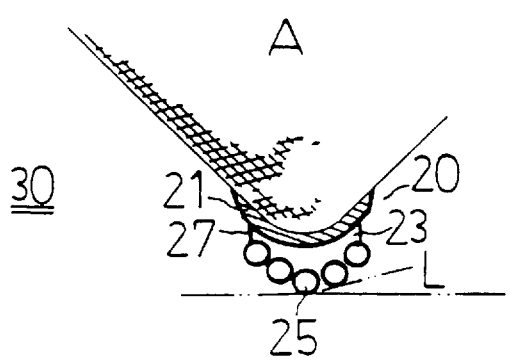
FIG. 7 is a schematic view illustrating the action of caster shown in FIG. 5.
Figures 8, 10:
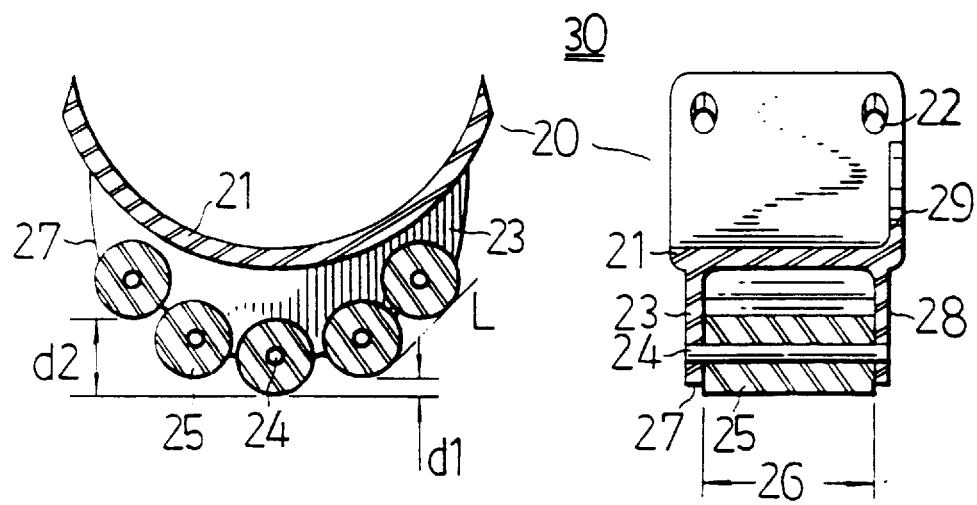
FIG. 8 is a schematic sectional view taken along line II—II of FIG. 5.
FIG. 10 is a schematic sectional view taken along line III—III of FIG. 9.

Referring to FIG. 8, the cylindrical element 25 at the middle serves as a fixed point, and it forms a drop d1 with the two neighboring cylindrical elements 25, and a drop d2 of a larger distance with the outermost cylindrical elements 25. Two adjacent cylindrical elements 25 are arranged in such a way that their outer circumferences define a level imaginary line L, which forms an inclining angle with the other level imaginary lines L. Referring to FIG. 6, when a case A having the caster 30 mounted at one corner is pulled, preferably, two of the cylindrical elements 25 come into contact with the ground surface. But if for uncertain factors such as the height of the user, the caster 30 may be pulled along with only a single cylindrical element 25 touching the ground.

Figure 9:
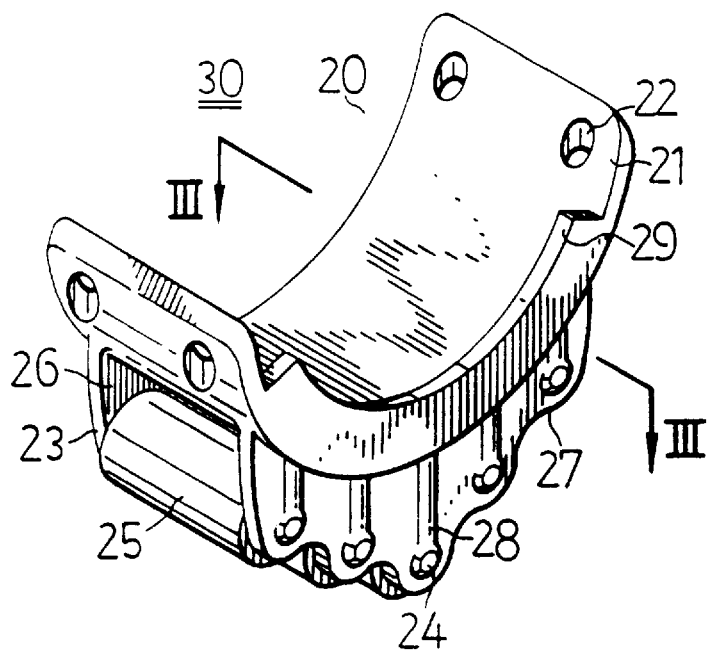
FIG. 9 is a schematic elevational view of a third preferred embodiment of the present invention.

FIG. 9 shows another preferred embodiment of the caster of the invention. The plate 21 has an urge piece 29 extending upwardly in a longitudinal direction from a lateral edge thereof. When the caster 30 is secured to the case by means of the positioning holes 22, the urge piece 29 may just urge against the lateral side of the case for positioning the caster.

In FIG. 10, the outer circumference of each cylindrical element is in a linear contact with the ground surface. When the outer circumferences of two adjacent cylindrical elements 25 simultaneously come into contact with the ground, there will be two linear contacts with the ground, which provide a steadier movement. Additionally, although it has been described that the cylindrical elements 25 are pivotally positioned between the protective covers 23 by shafts 24, they may also be injection molded to form cylindrical rollers having a projecting shaft portion at either end. The advantage of such a configuration is that, when the axes of the roller and the shaft portion are on the same center line, the rolling movement will be smoother.

Although the present invention has been illustrated and described with reference to the preferred embodiment thereof, it should be understood that it is in no way limited to the details of such embodiment but is capable of numerous modifications within the scope of the appended claims.

What is claimed is:

1. A caster structure for cases, comprising:
   a coupling frame comprising a curved plate and two opposed protective covers extending vertically from the bottom side of said plate, with a clearance defined between said covers; and
   a plurality of rollers, each of which is cylindrical and extending axially to form a shaft portion at either end for pivotal mounting on said protective covers in said clearance, such that any two adjacent rollers projecting from the bottom rims of said protective covers define a level line and may simultaneously come into contact with the ground surface while forming an inclining, angle with the rest of said rollers, said rollers adapted to be securely mounted on a case by means of said coupling frame to provide steadier and smoother sliding movement.

2. A caster structure for cases as claimed in claim 1, wherein said rollers may be cylindrical elements each having a shaft passing therethrough for pivotal connection.

3. A caster structure for cases as claimed in claim 1, wherein said protective covers are each provided with a plurality of reinforcing ribs corresponding to the mounting positions of said rollers.

4. A caster structure for cases as claimed in claim 1, wherein said plate has an urge piece extending vertically upward from a lateral side thereof.

* * * * *